(Specimens.)

J. T. SMITH.
PROCESS OF TREATING CORK.

No. 484,345. Patented Oct. 11, 1892.

WITNESSES:
William Miller
Edward Wolff

INVENTOR:
John T. Smith
BY
Van Santvoord & Hauff
ATTORNEYS

UNITED STATES PATENT OFFICE.

JOHN T. SMITH, OF NEW YORK, N. Y.

PROCESS OF TREATING CORK.

SPECIFICATION forming part of Letters Patent No. 484,345, dated October 11, 1892.

Application filed March 23, 1892. Serial No. 426,145. (Specimens.)

*To all whom it may concern:*

Be it known that I, JOHN T. SMITH, a citizen of the United States, residing at New York, in the county and State of New York, have invented new and useful Improvements in the Process of Treating Cork, of which the following is a specification.

This invention relates to the treatment of cork for industrial or other uses; and it consists in an improvement in the processes of treating the same, as is hereinafter described in this specification and specified in the claims thereof, reference being had to the accompanying drawings, in which—

Figure 1:
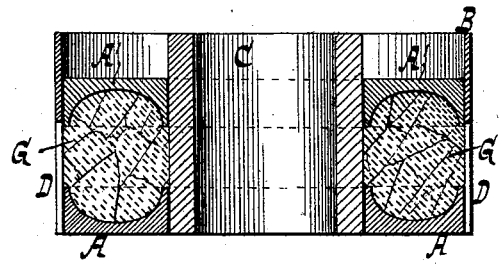
Figure 2:
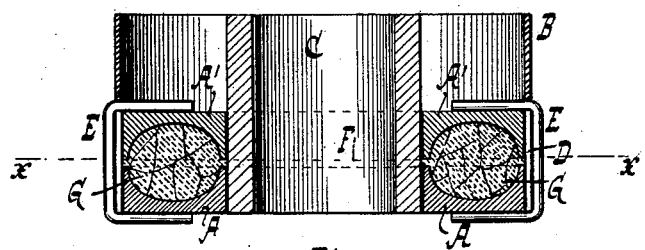
Figure 3:
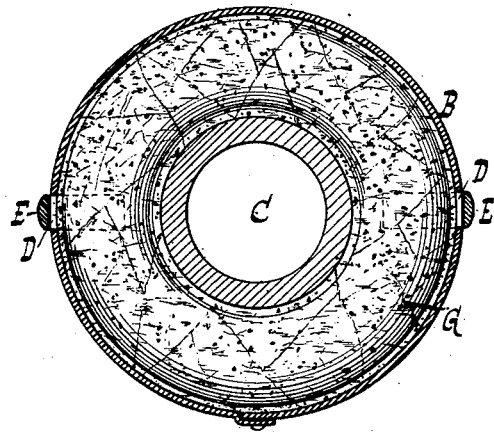
Figure 4:
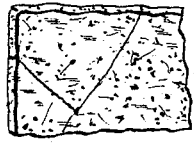

Figure 1 is a vertical section of a mold in which the cork may be treated according to my improved process and which is of suitable shape and construction for forming a ring of cork. Fig. 2 is a similar vertical section showing the mold having its upper and lower sections held together by the clamps of the mold. Fig. 3 is a horizontal section on the line *x x* of Fig. 2. Fig. 4 is a corner-piece of a board made of cork.

The material I use in my process is cork, which I take in pieces of any size, including the refuse of cork as it is procured from manufacturers and dealers in the article.

In treating cork according to my present invention I provide a hollow mold, which I fill with pieces of cork. The mold is made in sections, the divisions of which are preferably made on horizontal lines for greater ease in handling in carrying out my process. The divisions of the mold are held together by suitable clamps, and when the mold is properly filled with cork the whole is subjected to heat and pressure by any suitable or convenient means. A convenient mode of applying heat thereto is to place the mold after it is filled into an oven or furnace, and pressure can be applied to it by means of a press or by weights or heated rollers or plates or any convenient means or appliance. The degree of heat employed must be sufficient in connection with the pressure to cement and solidify the pieces of cork with each other, and the exposure of the cork to heat is continued until some of the resinous matter inherent in the cork is driven out therefrom. The application of heat causes the melting of the resinous matter in the cork and ultimately its vaporization, the resinous matter being thereby brought out upon the surfaces of the pieces of cork and between the same and into the interspaces and crevices between the several pieces, the resinous vapors becoming diffused throughout the body of the combined pieces of cork, so as to fill the interspaces and interstices therein. When the vapors condense, they form a cement which unites the pieces of cork and holds them together, protecting and preserving the mass in a high degree from becoming disintegrated or separated when exposed to or immersed in water. In addition to the treatment with heat I apply pressure to the cork, so as to bring the several pieces of cork into close contact and to make their sides and surfaces adhere closely to each other. The pressure is applied before or while the cork is being subjected to heat; but I do not restrict myself in that respect.

In order to further explain my invention, I illustrate it by the drawings in connection with an apparatus or mold suitable for making a life-preserver of the form of a ring-buoy.

In the drawings is shown a mold of ring form, made in two sections or divisions A A', the division being made on a horizontal line. The outside of the mold A A' is surrounded by a casing B of cylindrical form, and in its interior is placed a ring C, also of cylindrical form. The casing B is provided on opposite sides with vertical slots D D, which receive clamps E E, whose ends are inserted in the slots in such a manner as to embrace the sections A A' of the mold and hold them near to each other, but not so near as to make a perfectly-tight joint between the edges of the mold-sections, there being left a little space F between their edges to allow of the escape of the excess of resinous vapors from the mold during the operations of heating and pressing of the cork. In charging the mold the section A, with its concave side up, is first placed within the casing B, and the ring C is next placed within the section A. The cork G is then placed in section A of the mold in sufficient quantity to about fill the annular space between the casing B and the ring C. Section A' of the mold is next placed in the casing B with its concave side down. The sections of the mold are then pressed toward each other and brought nearly together, as shown in Fig. 2, a little space F being left between their edges unclosed to allow the escape of vapor from the mold. This pressure is made in the presence of heat to which the cork and the apparatus are subjected in an oven or furnace, and when the sections of the mold are brought together sufficiently near to allow of the application of the clamps E E the ends of the clamps are inserted in the slots D D in such a manner as to embrace the sections of the mold on opposite sides. The heat and pressure are continued until the pieces of cork are brought to the condition of a solid mass, which result is ascertained by inspection and examination of the cork under treatment.

In order to produce the proper pressure upon the mold and the cork contained therein, the casing B is filled up with blocks or some other suitable material high enough to be acted upon by the press and to transmit the pressure to the mold and the cork, or I may provide a ring or block in the annular space between the casing B and the ring C to receive and transmit the pressure desired.

In Fig. 3 the ring of cork produced in the mold is shown as it appears when the upper section A' of the mold is removed.

The process above described results in the production of a body of cork composed of pieces cemented to each other by the joint action of heat and pressure in connection with the vaporization of the resinous matter of the cork.

The process is applicable to the formation of any article from cork to which pressure and heat can be applied in suitable molds, it being evident that the cork will receive its shape from the molds by reason of the heat and pressure.

By this process the mass of cork acquires great solidity and great capacity for resisting moisture.

The casing B and ring C here shown are open at both ends.

In preparing the apparatus for heating and pressing the cork sufficient cork is supplied to the molds and apparatus to enable the proper pressure to be applied thereto, and a further supply of cork can be added, when desired, during the operation, so as to keep the molds full.

In cases where it is desired to facilitate the operation of pressing the cork and causing it to readily conform to the shape desired to be given to it by the molds I moisten the cork slightly, using for that purpose steam or water, as may be preferred. I do this, also, in cases where the cork is very dry and hard, so as to make the same impressible or pliable under the pressure it is subjected to.

What I claim as new, and desire to secure by Letters Patent, is—

1. The process of treating cork, which consists in vaporizing the resinous matter contained therein by heating the cork in a mold or other suitable vessel under pressure, substantially as described.

2. The process of treating cork, which consists in moistening the cork, confining it in a mold or suitable vessel, and subjecting it to heat and pressure, substantially as described.

In testimony whereof I have hereunto set my hand in the presence of two subscribing witnesses.

JOHN T. SMITH.

Witnesses:
WM. C. HAUFF,
E. F. KASTENHUBER.